Feb. 14, 1956 R. E. HIGLEY 2,734,979
BRAZING TIPS
Filed April 12, 1952

WITNESSES:
John E. Hensley
Wm. B. Sellers.

INVENTOR
Robert E. Higley.
BY
Hymen Diamond
ATTORNEY

United States Patent Office 2,734,979
Patented Feb. 14, 1956

2,734,979
BRAZING TIPS

Robert E. Higley, Clarence, N. Y., assignor to Westinghouse Electric Corporation, East Pittsburgh, Pa., a corporation of Pennsylvania Application April 12, 1952, Serial No. 281,977

5 Claims. (Cl. 219—4)

My invention relates to brazing apparatus and has particular relation to brazing tips.

It has been the practice in the electrical industry to join metal parts by brazing and particularly by what is called incandescent brazing. The coils of a motor or generator are joined in this way to the connectors. During the brazing operation, the parts to be joined with a suitable solder such as a silver-copper alloy or a phos-copper alloy between them are clamped between brazing tips held in the jaws of brazing tongs and alternating current is transmitted through the tips, the material, and the solder. Frequently, the parts to be brazed are so related that the brazing operation must take place in a restricted space. Where the space is restricted, the tips are relatively thin and have a short life.

In one situation of which I am aware, the coils of a motor are to be brazed to the connectors in a very narrow space. In this situation the practice in accordance with the teachings of the prior art is to carry out the brazing operation with carbon brazing tips having a thickness of only $3/16$ of an inch. I have found that because the brazing tips are relatively small they are useful for carrying out a very few number of brazing operations. In the situation described above, only 8 to 10 brazing operations can be carried out with each set of tips.

It is accordingly an object of my invention to provide brazing tips, particularly for brazing in a restricted space, which shall have a long life.

Another object of my invention is to increase the life of brazing tips.

A specific object of my invention is to increase the life of carbon brazing tips particularly designed for carrying out brazing operations in a restricted space.

My invention arises from the discovery that carbon tips covered on all of the surfaces or on all of the surfaces except those which engage the parts to be brazed, with aluminum paint have a substantially longer life than the uncoated tips. I have found that whereas uncoated tips have a life of only 8 to 10 brazes, the tips covered with aluminum paint have a life of 16 to 20 brazes.

The invention in its broader aspects is described above. In its more restricted aspects, my invention will be understood from the following description taken in connection with the accompanying drawing in which.

Figure 1:
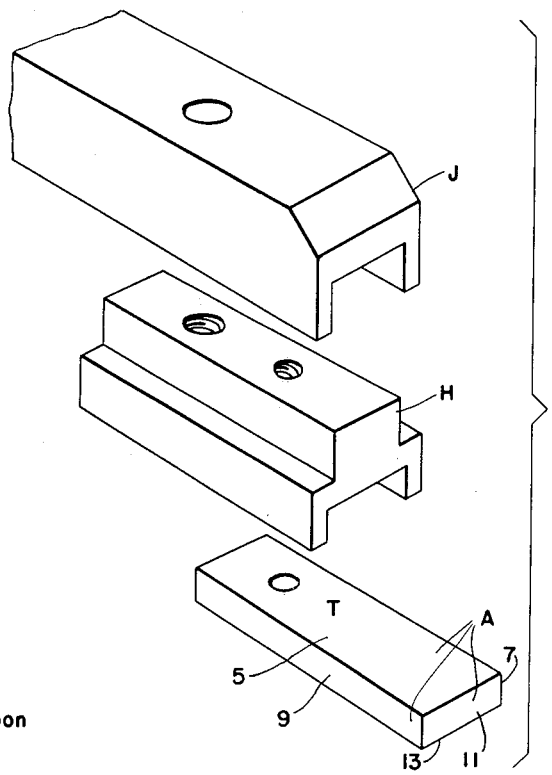
Figure 1 is an exploded view of a brazing assembly in accordance with my invention.
Figure 2:
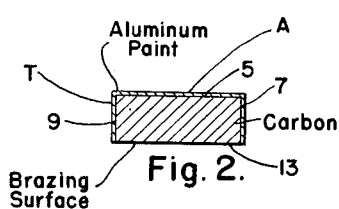
Fig. 2 is a cross sectional view of a brazing tip in accordance with my invention.
Figure 3:
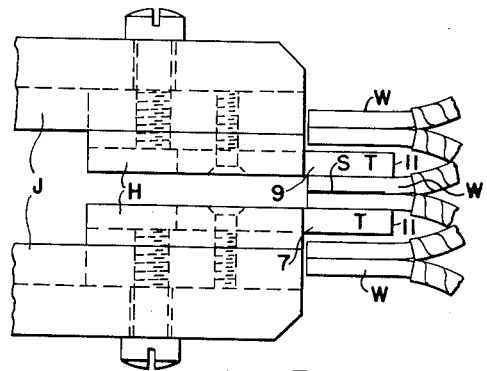
Fig. 3 is a view in side elevation of a brazing system in accordance with my invention in operation.

The apparatus disclosed in the drawing comprises a brazing rod or tip T composed of carbon. All of the faces 5, 7, 9, and 11 of this tip T except the face 13 which engages the parts to be brazed are covered by aluminum paint A which is applied by spraying. The aluminum may also be deposited in other ways, as for example by brushing, and may be in other forms than paint.

The apparatus includes a pair of such tips T, each of which is bolted in an electrically conductive tip holder H, the tip holders H being in turn bolted in jaws J of electrically conductive brazing tongs.

In operation, the jaws J of the brazing tongs are brought near the region of the parts W to be brazed and the tips T which protrude from the tongs are inserted in the space adjacent the parts to be brazed. The jaws are then moved so that the tips T engage the parts W clamping the solder S between the jaws and current is transmitted through the tips, the parts, and the solder. As has been explained, I have found that tips T in accordance with my invention of narrow cross section have a life of twice as many brazes as prior art tips. My invention is here illustrated as applied to tips of rectangular cross section. It is also applicable to tips of circular cross section and to tips of other shapes.

While I have shown and described a certain specific embodiment of my invention, many modifications thereof are possible. My invention, therefore, is not to be limited except insofar as is necessitated by the prior art.

I claim as my invention:

1. A brazing rod composed of carbon, a portion of the surface of which is adapted to engage parts to be brazed and a coating of aluminum on the remaining portion of the surface of said rod.

2. A brazing rod according to claim 1, characterized by the fact that the aluminum coating is a paint deposited on the remaining portion of the surface by spraying.

3. A brazing rod according to claim 1 which has the form of a polygonal cross section, all of the surfaces of said rod except one being coated with aluminum.

4. A brazing rod particularly for brazing in confined regions composed of carbon having a relatively small cross section characterized by the fact that said rod is coated with aluminum on all surfaces except the one adapted to engage the parts to be joined.

5. A brazing rod composed of carbon, a portion of the surface of which is adapted to engage work to be brazed and having a coating of aluminum over all of its surface including said portion.

References Cited in the file of this patent
UNITED STATES PATENTS

| | | |
|---|---|---|
| 473,117 | Heroult | Apr. 19, 1892 |
| 650,124 | Coleman | May 22, 1900 |
| 2,348,884 | Dewees | May 16, 1944 |
| 2,398,427 | Hediger | Apr. 16, 1946 |
| 2,451,290 | Kephart et al. | Oct. 12, 1948 |